United States Patent [19]

Seki et al.

[11] Patent Number: 4,919,710
[45] Date of Patent: Apr. 24, 1990

[54] CONDENSATE DRAINAGE APPARATUS

[75] Inventors: Masao Seki, Chiba; Hiroki Higashino, Tokyo, both of Japan

[73] Assignees: Mitsui Petrochemical Industries, Ltd.; Ciluck Co., Ltd., both of Tokyo, Japan

[21] Appl. No.: 157,618

[22] Filed: Feb. 19, 1988

[30] Foreign Application Priority Data

Feb. 20, 1987 [JP] Japan .............................. 62-22653[U]
Jun. 23, 1987 [JP] Japan ................................ 62-154513
Jun. 23, 1987 [JP] Japan ................................ 62-154514

[51] Int. Cl.$^5$ ............................................. B01D 35/02
[52] U.S. Cl. ...................................... 55/417; 55/446; 55/466
[58] Field of Search .......... 55/327, 417, 442, 444–446, 55/466; 210/431, 432

[56] References Cited

U.S. PATENT DOCUMENTS

| | | | |
|---|---|---|---|
| 381,150 | 4/1888 | Lowden | 55/445 X |
| 434,675 | 8/1890 | McDaniel | 55/445 X |
| 512,681 | 1/1894 | Clute | 55/446 |
| 773,830 | 11/1904 | Vater | 55/446 X |
| 917,400 | 4/1909 | Austin | 55/445 X |
| 1,026,675 | 5/1912 | Hickey | 55/445 |
| 1,328,889 | 1/1920 | Olesen | 55/446 X |
| 1,632,325 | 6/1927 | Anderson | 55/446 |
| 1,664,333 | 3/1928 | Taylor | 55/446 X |
| 1,752,260 | 3/1930 | Calder et al. | 55/446 |
| 1,774,295 | 8/1930 | Smallhouse | 55/446 X |
| 2,163,600 | 6/1939 | How | 55/444 |
| 2,202,164 | 5/1940 | Pascale | 55/417 |
| 2,633,149 | 3/1953 | McKenna | 210/431 |
| 2,738,804 | 3/1956 | Ryan | 210/431 |
| 3,016,972 | 1/1962 | Dugas | 55/442 X |
| 3,199,273 | 8/1965 | Kudsi | 55/446 X |
| 3,570,221 | 3/1971 | Oliver | 55/446 X |
| 3,676,024 | 7/1972 | Akaiki et al. | 55/327 X |
| 3,892,550 | 7/1975 | Riis | 55/446 X |
| 4,087,263 | 5/1978 | Schönmann, Jr. | 55/417 X |

FOREIGN PATENT DOCUMENTS

| | | | |
|---|---|---|---|
| 32820 | 5/1908 | Austria | 55/446 |
| 452325 | 11/1948 | Canada | 55/417 |
| 11711 | 12/1880 | Fed. Rep. of Germany | 55/446 |
| 37019 | 4/1981 | Japan | 55/446 |
| 602098 | 6/1983 | Japan . | |
| 21915 | of 1896 | United Kingdom | 55/446 |
| 342200 | 1/1981 | United Kingdom | 55/417 |

Primary Examiner—Robert Spitzer
Attorney, Agent, or Firm—Birch, Stewart, Kolasch & Birch

[57] ABSTRACT

An apparatus for draining condensate from vapor equipment comprises a cylindrical casing connected in fluid communication with the vapor equipment and defining a flow path for conveying vapor and condensate, an orifice disk disposed in the casing to traverse the flow path and having a plurality of orifices formed therein, and at least one partition disposed in the casing upstream or downstream of the orifice disk with a predetermined spacing therefrom, the partition covering a predetermined portion of the flow path. The structure is applicable to a variety of valves including sluice and ball valves.

7 Claims, 8 Drawing Sheets

CONDENSATE DRAINAGE APPARATUS

BACKGROUND OF THE INVENTION

1. Field of the Invention

This invention relates to an apparatus for draining condensate from vapor equipment including steam conveying conduits, steam distribution lines, heat exchangers, dryers and air conditioners wherein part of the steam condenses into a drain.

2. Discussion of the Prior Art

A typical condensate drainage apparatus includes a cylindrical casing and an orifice formed therein. The drainage apparatus is connected to steam equipment whereby drain is conveyed to the outside of the equipment through the orifice under the pressure of steam.

It is desired for this type of drainage apparatus that any drain is fully removed, leakage of steam is prevented, and foreign matters including rust, scale, dust, and metal debris which are left during attachment of the apparatus or connection of conduit do not clog the orifice. It is difficult to construct a drainage apparatus capable of meeeting all these requirements. Previous apparatus has orifices arranged in plural stages in a flow path wherein the pressure difference between inlet and outlet ports of the path is sheared by these orifices. This design has the advantage that leakage of steam is minimized even when the orifices have an increased diameter. The apparatus, however, does not perform well when a great amount of drain is to be disposed of.

SUMMARY OF THE INVENTION

It is, therefore, an object of the present invention to provide a condensate drainage apparatus which can discharge any amount of drain varying from zero to a substantial amount, prevent an orifice from being clogged with foreign matters, and allow little leakage of steam.

Another object of the present invention is to provide a condensate drainage apparatus which can discharge drain independent of whether the amount of drain is large or small, and allows little leakage of steam.

According to a first aspect of the present invention, there is provided an apparatus for draining condensate from a vapor equipment, comprising a cylindrical casing connected in fluid communication with the vapor equipment and defining a flow path for conveying vapor and condensate, an orifice disk disposed in the casing to traverse the flow path and having a plurality of orifices formed therein, and at least one partition disposed in the casing upstream and/or downstream of the orifice disk with a predetermined spacing therefrom, the partition covering a predetermined portion of the flow path.

According to a second aspect of the present invention, there is provided an apparatus for draining condensate from a vapor equipment, comprising a sluice valve casing connected in fluid communication with the vapor equipment and defining a flow path for conveying vapor and condensate, a valve plug movably mounted in the casing to controllably traverse the flow path, and an orifice disk disposed in the casing upstream and/or downstream of the valve plug with a predetermined spacing therefrom to traverse the flow path, the orifice disk being formed with a plurality of orifices.

According to a third aspect of the present invention, there is provided an apparatus for draining condensate from a vapor equipment, comprising a valve casing connected in fluid communication with the vapor equipment and defining a flow path for conveying vapor and condensate, the valve casing having a valve opening, a valve plug associated with the valve opening to close and open the valve opening, and an orifice disk disposed in the valve opening, the orifice disk being formed with a plurality of orifices, wherein a steam stagnating section and a condensate collecting section are defined in the flow path upstream of the orifice disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features, and advantages of the present invention will be better understood by reading the following description taken in conjunction with the accompanying drawings which are given by way of illustration only, and thus are not limitative of the present invention, and in which:

FIGS, 1 through 6 illustrate various embodiments of a condensate drainage apparatus according to the first aspect of the present invention.

FIGS 7 through 11 illustrate various embodiments of a condensate drainage apparatus according to the second aspect of the present invention.

FIGS. 12 through 14 illustrate various embodiments of a condensate drainage apparatus according to the third aspect of the present invention.

DESCRIPTION OF THE PREFERRED EMBODIMENTS

The condensate drainage apparatus according to the first aspect of the present invention will now be described. The apparatus of the above construction is connected to steam equipment, typically a conduit thereof in a horizontal arrangement. Since drain is present near the bottom of the conduit, the drain passes through an open space left in the flow path below the partition to reach the orifices. The drain is thus discharged out of the apparatus through the orifices.

In the embodiment wherein the apparatus is connected in a horizontal position, the partition is located upstream of the orifice disk interfer with an upper space of the flow path of the cylindrical casing to prevent passage of steam. Leakage of steam is thus minimized. As defined above, the orifice disk is formed with a plurality of orifices. Preferably, those orifices located in a lower portion of the disk have a larger diameter than those orifices located in an upper portion of the disk, allowing a great amount of condensate flowing along the bottom of the conduit to be smoothly drained. Foreign matter such as rust and dust and debris which would be sometimes introduced or generated tend to collect near the bottom of the conduit. Location of a larger diameter orifice in a lower portion of the disk is convenient to convey away such foreign matter along with the drain through the orifice. There is little likelihood that the orifice might be clogged to interrupt drainage.

The apparatus is compact since the orifice disk and the partition are disposed within the cylindrical casing. Maintenance and inspection is usually unnecessary and if necessary, may be carried out simply by removing the orifice disk and partition from the casing. The apparatus has a simple structure which is easy to assemble and inexpensive to manufacture, and has little chance of failure.

In the practice of the present invention, the components of the apparatus including the cylindrical casing, orifice disk and partition are desirably formed of corrosion resistant steel such as stainless steel. Only for a manufacturing reason, the partition is desirably secured to a cylindrical space by welding. It suffices according to the present invention that the orifice disk and the partitions are disposed within the casing although it is desired that a retainer ring be threadably engaged in the casing to retain the orifice disk and the partition in place.

Figure 1:
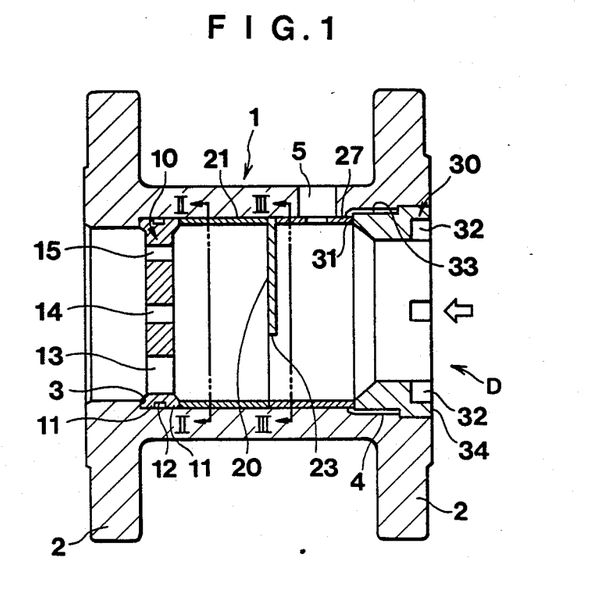
FIG. 1 being an axial cross section of one embodiment.

Referring to FIGS. 1 through 6, there is illustrated a condensate drainage apparatus according to the first aspect of the present invention. In FIG. 1, a condensate drainage apparatus generally designated at D includes a cylindrical casing 1, an orifice disk 10, a partition 20, and a retainer ring 30. The cylindrical casing 1 defines an axial bore therein for conveying steam and condensate in a direction indicated by the arrow. The casing 1 has radial flanges 2 and 2 at opposed ends so that the casing can be directly or indirectly connected to steam equipment or conduit through the flange. On the downstream side, that is, on the left side in FIG. 1, the inside wall of the cylindrical casing 1 is provided with a step 3 so that the inside wall includes an upstream portion having a larger diameter and a downstream portion having a smaller diameter. The orifice disk 10 is mounted in the larger diameter portion adjacent the step 3. On the upstream side, that is, on the right side in FIG. 1, the inside wall of the cylindrical casing 1 is machined with threads 4 and a screw 5 is provided.

The orifice disk 10 includes collars 11 and 11 having an outer diameter substantially equal to the inner diameter of the larger diameter inside wall portion of the cylindrical casing 1. An O-ring 12 is fitted between the collars 11 and 11. The orifice disk 10 is provided with a plurality of orifices. As seen from FIG. 2, an orifice 13 having a relatively large diameter of, for example, 16 mm is located in a lower portion, preferably at the bottom of the disk. Five orifices 14 having a relatively small diameter of, for example, 8 mm are spaced an equal distance from the center of the orifice 13. The central one of these small orifices 14 is concentric with the orifice disk 10. On each side of the center orifice 14, two orifices 14 are located at an angle of 30°.

Figure 2:
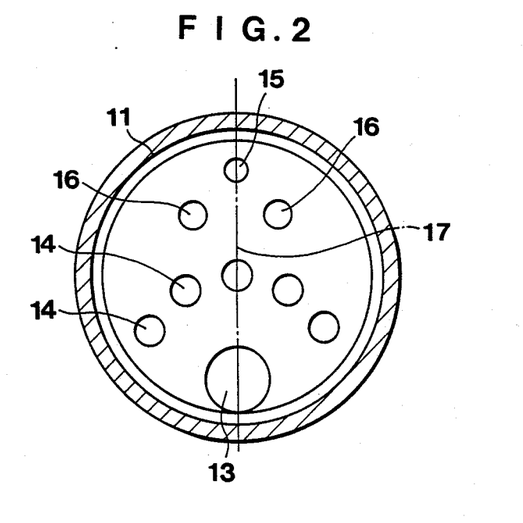
FIGS. 2 and 3 being radial cross sections taken along lines II—II and III-—III in FIG.1.

However, the lowermost one of the orifices in the orifice disk may preferably have the largest diameter.

The orifice disk 10 is further formed with orifices 15, 16, 16 in an upper portion. The orifice 15 having a diameter of 6 mm, for example, is located on a vertical centerline 17. The other orifices 16 and 16 having a diameter of 7 mm, for example, are located on lines crossing the centerline 17 at an angle of 45° and spaced an equal distance from the orifice 15. The orifice 13 constitutes a relatively large diameter orifice while the remaining orifices 14, 15 and 16 constitute relatively small diameter orifices. For the above-exemplified diameters of the orifices, the orifice disk 10 has an outer diameter of 80 mm, for example.

The partition 20 is vertically mounted in the bore of the cylindrical body 1 and located upstream of the orifice disk 10 with a predetermined spacing from the disk. Two cylindrical spacers 21 and 27 are fitted in the bore of the cylindrical body 10 to hold the partition 20 in place. The partition 20 is fixedly secured to the downstream spacer 21. As seen from FIG. 3, the partition 20 is of a semi-circular shape in a plan view and has a horizontal lower edge 23 which is extended downward beyond the central axis of the cylindrical casing 1. This means that a lower portion of the bore of the cylindrical casing 1 is left open while an upper portion thereof is closed by the partition 20.

The retainer ring 30 which is an annular member having a bore for conveying steam and condensate is threaded into the cylindrical casing 1 at the upstream end. The retainer ring 30 has a downstream end 31 which urges the corresponding end of the spacer 27. To this end, the retainer ring 30 is provided on the outer wall with male threads 33 which are in engagement with the female threads 4 inside the cylindrical casing 1. The retainer ring 30 is axially moved through threaded engagement. The retainer ring 30 is provided on the upstream end surface with a pluarlity of recesses 32. A suitable tool (not shown) may be engaged with the recesses 32 to rotate the retainer ring 30 to axially move it back and forth.

Figure 3:
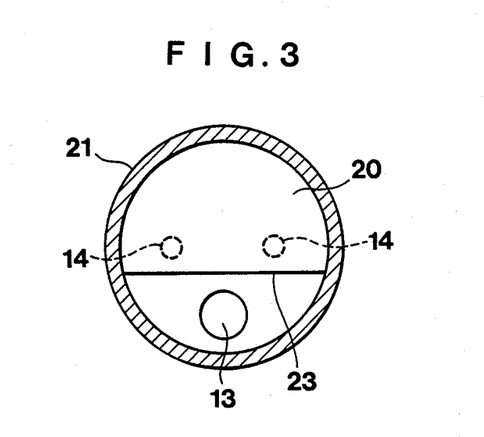

This structure is assembled by first inserting the orifice disk 10 into the bore of the cylindrical body 1 from the right in FIG. 1. Of course, the O-ring 12 is previously fitted on the orifice disk 10. Then the spacer 21 is inserted into the cylindrical body bore. Preferably the partition 20 is secured to the spacer 21 as by welding before the spacer 21 is inserted such that the open portion below the partition 20 comes in axial alignment with the large orifice 13 as shown in FIG. 3. Next, the other spacer 27 is inserted into the bore and the retainer ring 30 is threadably engaged therein. Assembly is complete when the downstream end of the orifice disk 10 abuts against the step 3 and the end surface 234 of the retainer ring 30 is approximately flush with the upstream flange surface of the cylindrical body 1. It is evident that the structure can be disassembled by reversing following the procedure.

Figure 4:
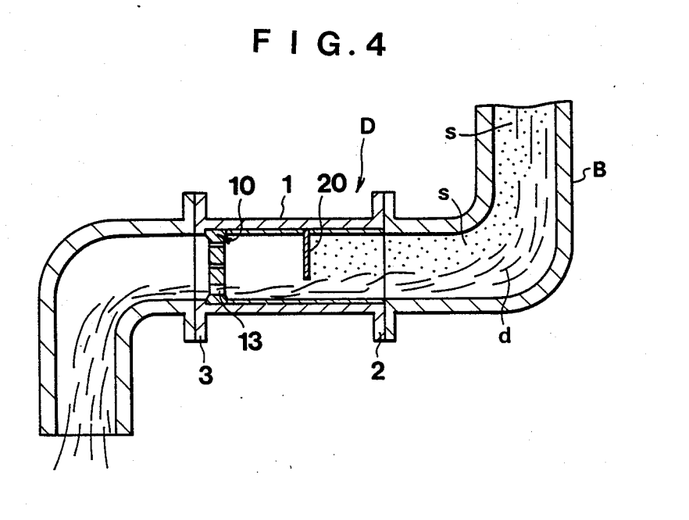
FIG. 4 being a cross section of the apparatus in operation.

This embodiment is used as shown in FIG. 4. The condensate drainage apparatus D is connected between upstream and downstream conduit sections B such that the axis of the appartus extends horizontally and the large orifice 13 is located at the bottom. If condensate d forms in a lower portion of the upstream pipe section B, the condensate d flows horizontally through the section B along its bottom together with some steam S. Then the condensate d flows past the open lower portion of the cylindrical casing 1 below the partition 20 and is then drained through the large orifice 13. Since the steam S stays in a relatively upper space in the conduit section B and the apparatus D, further downstream flow of steam is prevented by the partition 20. Thus, only a minimal amount of steam can escape. Even when a foreign matter is present in the condensate d, it is conveyed outside along with the condensate through the large orifice 13. Since the orifice 13 has a relatively large diameter, a certain amount of condensate can be drained through this orifice 13. When more condensate forms, it can be drained through upper orifices 14, 15 and 16 in addition to the orifice 13.

In one example, the cylindrical body 1 has an inner diameter of 80 mm, the large orifice 13 has a diameter of 16 mm, the orifices 14 have a diameter of 8 mm, the orifice 15 has a diameter of 6 mm, and the orifices 16 have a diameter of 7 mm. Under a steam pressure of 0.45 kg/cm$^2$-G, a back pressure of 0.20 kg/cm$^2$-G, and a pressure head of 0.25 kg/cm$^2$-G, the amount of condensate which can be drained through the apparatus ranges from 6 to 4.8 ton/hour depending on the leakage amount of steam.

Figure 5:
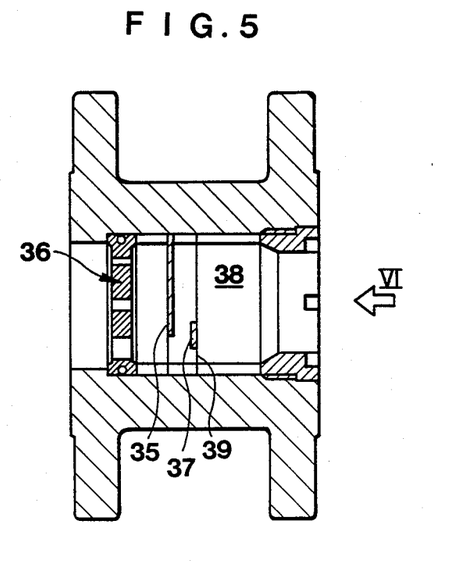
FIG. 5 being a cross section of another embodiment.
Figure 6:
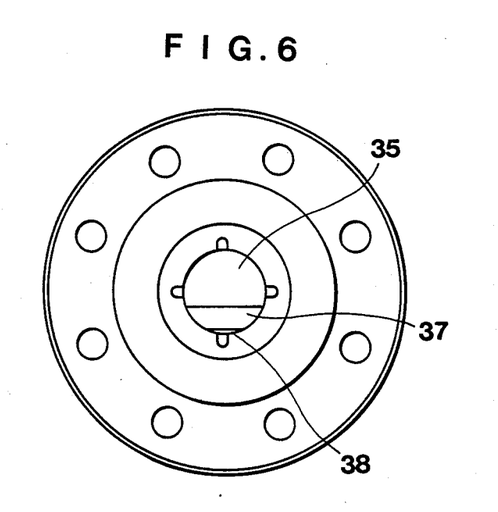
FIG. 6 is a radial cross section as viewed in the direction of an arrow VI in FIG. 5.

FIGS. 5 and 6 illustrate another embodiment of the apparatus according to the first aspect of the present invention. In this embodiment, first and second partitions 35 and 37 are located upstream of an orifice disk 36 in a flowpath 38 of a flanged cylindrical casing. The first partition 35 extends vertically downward from the top and terminates at a lower edge while the second partition 37 is positioned below and extends perpendicular to the central axis of the flowpath 38. A lower portion of the second partition 37 is provided with a cut-out 39 through which liquid or fine particles can pass. The second partition 37 has a lower edge which is vertically located below the lower edge of the first partition 35.

This arrangement allows steam to pass through the flowpath 38 until the surface of incoming liquid from the right side in FIG. 5 reaches the lower edge of the first partition 35. After the surface of liquid rises beyond the lower edge of the first partition 35, the steam path is closed. Then the internal steam pressure increases so that steam may eventually flush out while flooding the liquid.

This embodiment has the advantage that the available cross-sectional area of the steam flowpath can be controlled to be wide or narrow or to be high or low in a vertical direction by properly setting the two partitions. With a single partition, the controllable range is limited.

The foreging embodiments of the present invention are suitable for horizontal placement. Since a lower one among a plurality of orifices perforated in the orifice disk generally has a large diameter and the partition having only a lower portion opened is located upstream of the orifice disk, a great amount of condensate can be drained through the lower portion of the partition and then the large diameter orifice. At the same time, the partition prevents steam from escaping. Since the orifice disk and the partition are mounted within the cylindrical casing, the entire apparatus is compact and convenient to handle. Foreign matter such as rust, scale and dust are readily conveyed with the draining condensate.

It is possible that the lower orifice has the same diameter as the upper orifices. These embodiments can be placed in a vertical position without changing the orifice diameter.

The exact positions where a plurality of orifices are located on the orifice disk depend on a particular embodiment. In an embodiment suitable for vertical placement, an orifice disk having orifices of an equal diameter located at an equal spacing is suitable for most applications.

Next, the apparatus according to the second aspect of the present invention will be described.

The apparatus according to the second aspect ensures that condensate is drained through orifices by changing the lift of the valve plug traversing the flowpath to change the number of available orifices so as to meet the flow rate of condenste while the valve prevents leakage of steam. The orifice disk may be mounted in a casing adjacent the valve plug in several ways. That is, an orifice disk may be located upstream or downstream of the valve plug, or two orifice disks are located both upstream and downstream of the valve plug. It is also possible to locate more than two orifice disks. The apparatus according to the second aspect can be readily incorporated at a location which experiences a substantial change in flow rate of condensate or in steam equipment in which the flow rate of condensate is not exactly estimated because the apparatus can be operated under efficient conditions by post adjustments. When the flow rate of condensate is zero, the valve plug is moved to its full close position so that the valve may function as a shut-off valve.

In the practice of the present invention, the components including the casing, valve plug, and orifice disk are preferably formed of stainless steel.

It is preferred that a plurality of orifices have an equal diameter and are arranged in symmetry with respect to vertical and horizontal lines passing the axis of the disk and at an equal spacing.

Referring to FIGS. 7 through 11, the apparatus according to the second aspect of the present invention is illustrated.

Figure 7:
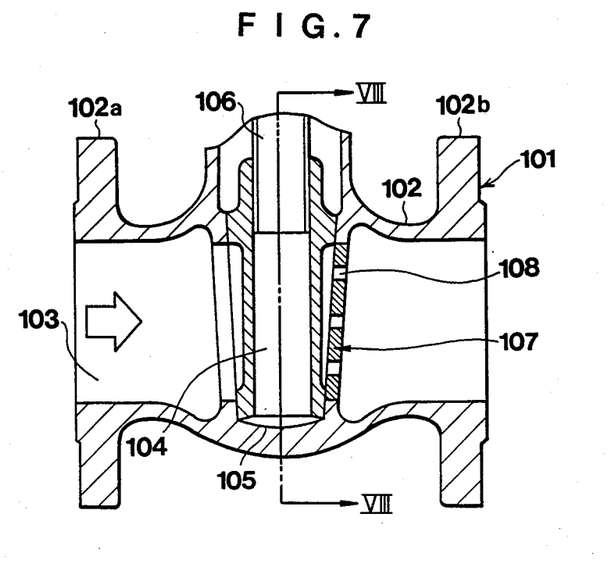
FIG. 7 being an axial cross section of one embodiment in a closed state.
Figure 8:
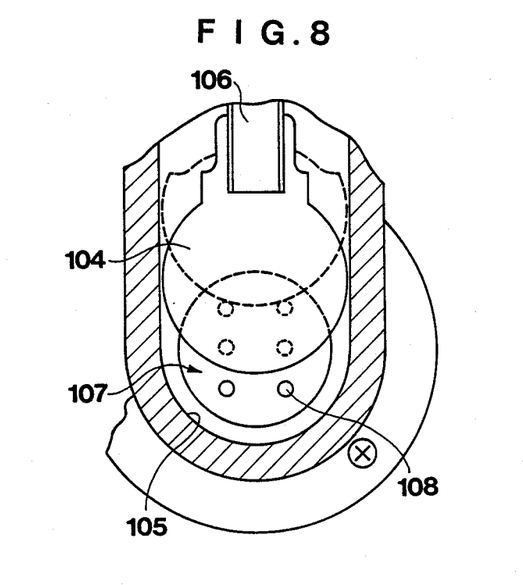
FIG. 8 being a radial cross section taken along lines VIII—VIII in FIG. 7.

In FIGS. 7 and 8, the condensate drainage apparatus includes a horizontally placed sluice valve generally designated at 101 defining a flowpath 103 and an orifice disk 107 mounted in the flowpath 103.

The sluice valve 101 is substantially designed according to the Japanese Industrial Standard. The valve 101 includes a casing 102 defining a flowpath 103 of a circular cross section and having flanges 102a and 102b at opposed ends. A valve plug 104 is received in a recess 105 in the casing 102 so as to traverse the flowpath from above. The valve plug 104 is connected to a valve stem 106 so that the plug may be lifted by the stem. The sluice valve 101 may be directly or indirectly connected to steam equipment or a conduit through the flanges 102a and 102b such that the flange 102a is upstream and fluid flows in a direction indicated by the arrow.

The orifice disk 107 is disposed in the bore of the casing 102 adjacent to, preferably in close contact with a downstream radially extending rim defining the recess 105. The orifice disk 107 is fixedly secured to the casing 102 in an oblique orientation such that an upper portion of the disk 107 is tilted in a downstream direction. The orifice disk 107 is formed with six orifices 108 having an equal diameter which are located in symmetry with respect to vertical and horizontal lines crossing the axis and at an equal spacing.

The operation of the embodiment shown in FIGS. 7 and 8 will now be described.

Figure 9:
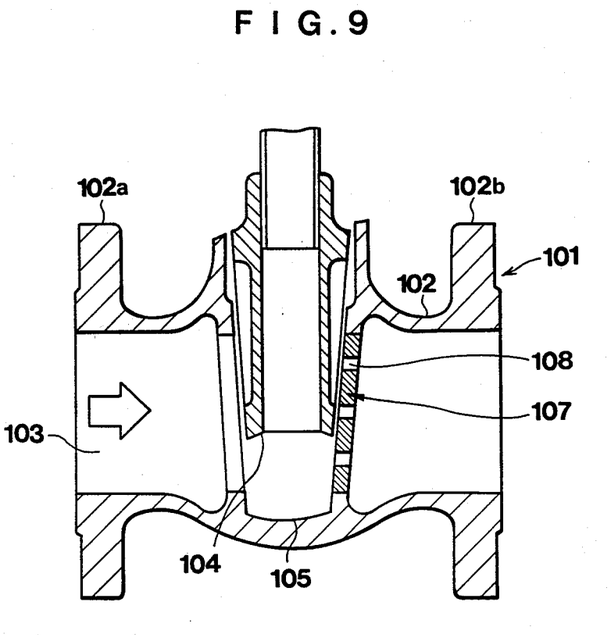
FIG. 9 being a cross section similar to FIG. 7, but in a half open state.

FIG. 9 shows the apparatus in which the valve plug 104 is slid upward about one third (⅓) of its entire lift so as to meet the flow rate of condensate. In this state, the condensate passes through the flow path 103 together with some steam along the bottom wall in a horizontal direction. Then the condensate enters the open space which is kept open below the valve plug 104 and leaves the casing through the lower pair of orifices 108. On the other hand, the valve plug 104 prevents passage of steam which occupies a relatively upper space of the flow path 103. Therefore, only a limited amount of steam can leak out of the apparatus.

When the flow rate of condensate is greater, the valve plug 104 is further slid upward so that the condensate will pass through the first and second pairs of orifices 108. To accommodate for the maximum flow rate of condensate, the valve plug 104 is lifted to the highest position shown by dot-and-dash lines in FIG. 8 so that the condensate will be drained through all the orifices 108. It is to be understood that when the flow rate of condensate is zero, the lift of the valve plug 104 is controlled to be zero, that is, the valve plug 104 is pushed down to the rest position to interrupt the flow path 103. The valve functions as a shut-off valve in this condition.

Figure 10:
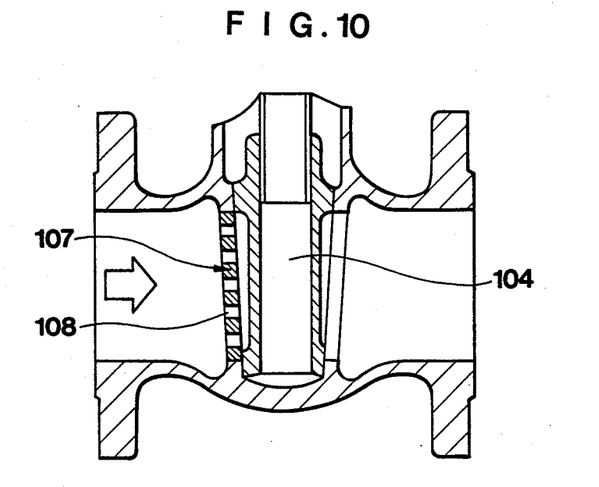
FIG. 10 being a cross section of another embodiment.
Figure 11:
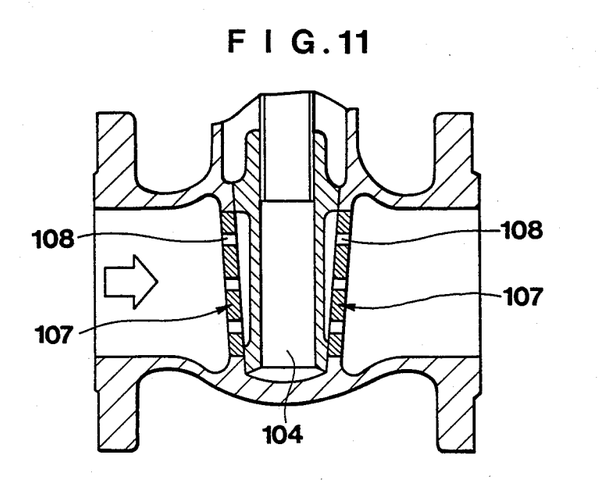
FIG. 11 is a cross section of a further embodiment.

Other embodiments of the present invention are illustrated in FIGS. 10 and 11. FIG. 10 shows the embodiment wherein the orifice disk 107 is located upstream of the valve plug 104. FIG. 11 shows the embodiment wherein two orifice disks 107 are located upstream and downstream of the valve plug 104.

In the apparatus according to the second aspect of the present invention, the flow path is interfered from above by the valve plug in accordance with a particular flow rate of condensate while the valve plug prevents leakage of steam.

As shown in the first aspect of the invention, the lowermost one of the orifices in the orifice disk may have the largest diameter.

Finally, the apparatus according to the third aspect of the present invention will now be described.

The condensate drainage apparatus of the present invention may be used in any position including horizontal, vertical and various intermediate positions. The lift of the valve plug is changed so as to meet the flow rate of drain. The back pressure on the orifice outlet side is controlled to regulate the flow rate of drain passing the orifices with high precision over a wide range. Particularly when the apparatus is set in a horizontal position, leakage of steam is prevented by causing steam to stagnate in an upper portion of a downward transition portion on the flowpath inlet side of the casing. As a result, the apparatus can be attached to steam equipment which undergoes a substantial change in flow rate and in which the flow rate of condensate is not accurately determined. The apparatus can be operated under optimum conditions by post adjustments. When the flow rate of condensate is zero, the valve plug is moved to fully close the flowpath so that the valve functions as a shut-off valve.

In the practice of the present invention, the components including the casing, valve plug and orifice disk are preferably formed of stainless steel.

Preferably, orifices of an equal diameter are disposed at an equal spacing in a concentric arrangement.

Figure 12:
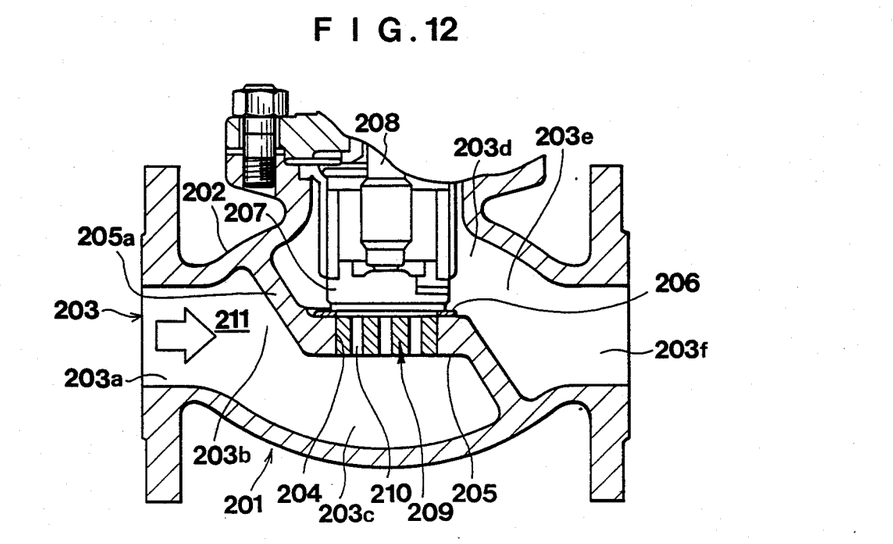
FIG. 12 being an axial cross section of one embodiment.
Figure 13:
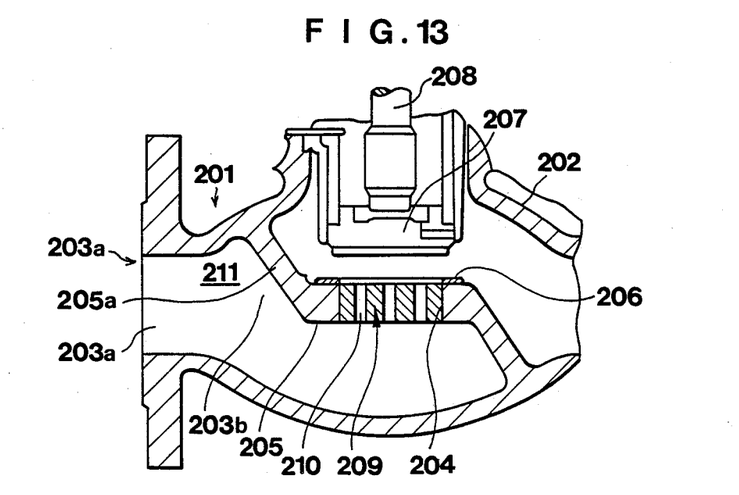
FIG. 13 being a cross section similar to FIG. 12, but in a half open state.

Referring to FIGS. 12 and 13, one embodiment of the apparatus according to the third aspect of the present invention is illustrated. The condensate drainage apparatus includes a ball valve generally designated at 201 and an orifice disk 209 mounted in a circular opening 204 of the ball valve.

The ball valve 201 is designed substantially according to the Japanese Industrial Standard. The valve 201 includes a casing 202 defining a flow path 203 and a valve plug 207 adapted to horizontally close the opening 204 from above. The valve plug 207 is connected to a valve stem 208 so that the plug may be lifted by the stem. A partition 205 obliquely extends across the flow path 203 to define a horizontal section 203a, a downward transition section 203b, and a lower semi-spherical section 203c on the upstream side and an upper semi-spherical section 203d, a downward transition section 203e, and a horizontal section 203f on the downstream side. The lower and upper semi-spherical sections 203c and 203d are in communication through the valve opening 204. The partition 205 is provided with a valve seat 206 adapted to receive the valve plug 207. A downward extending portion 205a of the partition 205 defines in an upper portion of the downward transition section 203b. This upper portion is a zone 211 where steam stagnates. The lower semi-spherical section 203c forms a zone where condensate collects.

The orifice disk 209 is fixedly secured to the valve opening 204 over its entire circumference. The orifice disk 209 is formed with a center orifice 210 at the axis and six other orifices 210 arranged about the axis at equal circumferential spacings. The casing 202, valve plug 207 and orifice disk 209 are formed of stainless steel.

The operation of the apparatus will now be described.

FIG. 13 shows the apparatus in which the valve plug 207 is moved upward about one half (½) of its entire lift so as to meet a flow rate of condensate. In this position, condensate enters the horizontal section 203a together with some steam and then the downward transition section 203b where steam stagnates in the steam accommodation zone 211. Thus only the condensate flows to the lower semi-spherical section 203c where the condensate collects and is then drained through the orifices 210. The steam stays in the steam accommodation zone 211 of the flow path as described above so that its leakage is minimized. When the flow rate of condensate is greater, the valve plug 207 is further lifted so that the condensate is drained in a greater flow rate. When the flow rate of condensate is zero, the lift of the valve plug 207 is kept zero to close the valve opening 204 so that the valve functions as a shut-off valve.

Figure 14:
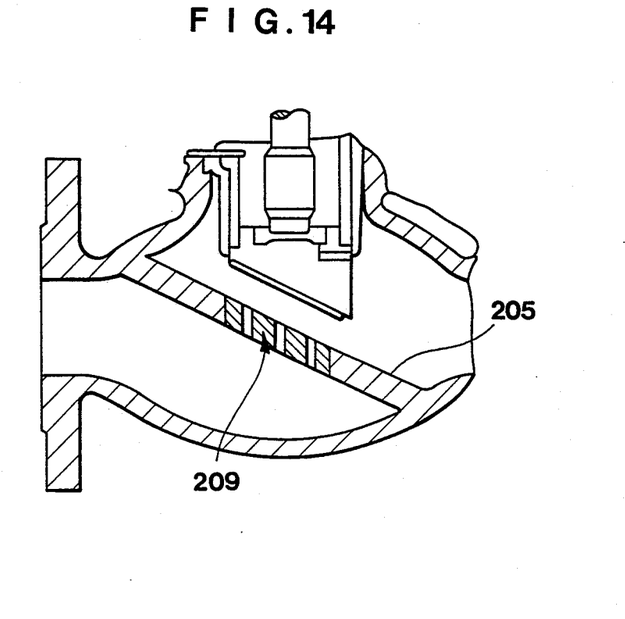
FIG. 14 being a cross section of another embodiment.

This embodiment has an advantage inherent to the ball valve in that the lift of the valve plug can be precisely adjusted to meet the flow rate of condensate over a wide range. Therefore the apparatus of this embodiment is preferably used at a site where the amount of condensate is to be regulated or with equipment in which the amount of condensate is not definitely estimatable. FIG. 14 shows another embodiment of the apparatus according to the third aspect of the present invention. This embodiment is similar to that of FIG. 12 except that the partition 205 is straight and extends obliquely and the orifice disk 209 fitted in the valve opening in the partition is also extended obliquely.

When the apparatus according to the third aspect of the present invention is set in a horizontal position, the lift of the valve plug is changed to meet the flow rate of condensate so that the flow rate of condensate which can pass through the orifices can be regulated with high precision, ensuring that the condensate is drained through the orifices. Steam is collected in an upper zone of a downward transition section of the flowpath inlet side so that leakage of steam is prevented. As a result, the apparatus can be used at a site where regulation must be made so as to meet a widely varying flow rate of condensate or where the flow rate of condensate is difficult to estimate.

The term steam is used as a typical example of the vapor to which the apparatus of the invention is applicable. Although the several preferred embodiments are described, modifications and changes may be made thereto without departing from the scope and spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for draining condensate from vapor equipment comprising:
    a cylindrical casing having two ends and defining a flow communication path for conveying condensate, wherein one end is connected in fluid communication with the vapor equipment and the other end drains the condensate;
    an orifice disk disposed in said casing to traverse the flow path and having a plurality of orifices formed therein;
    at least one partition disposed in said casing upstream of said orifice disk with a predetermined spacing therefrom, said partition covering a predetermined portion of the flow path; and
    a combination of the at least one partition and the orifice disk wherein the condensate and the vapor are separated by the combination, which generally presents further downstream flow of the vapor while allowing the condensate to be drained through the orifice disk, separation of condensate and vapor utilizing gravity.

2. The apparatus of claim 1 wherein the lowermost one of the orifices in the orifice disk has the largest diameter.

3. The apparatus of claim 1 which comprises a plurality of partitions disposed in said casing upstream and downstream of said orifice disk, wherein a lower edge of the upstream partition is positioned vertically below a lower edge of the downstream partition.

4. An apparatus for draining condensate from vapor equipment, comprising:
    a sluice valve casing having two ends and defining a flow path for conveying condensate, wherein one end is connected in fluid communication with the vapor equipment and the other end drains the condensate;
    a valve plug movably mounted in said casing to controllably traverse the flow path;
    an orifice disk disposed in said casing at least at one of an upstream and downstream position relative to the valve plug with a predetermined spacing therefrom to traverse the flow path, said orifice disk being formed with a plurality of orifices; and
    a combination of the valve plug and the orifice disk wherein the condensate and the vapor are separated by the combination, which generally prevents further downstream flow of the vapor while allowing the condensate to be drained through the orifice disk, separation of condensate and vapor utilizing gravity.

5. The apparatus of claim 4 wherein the lowermost one of the orifices in the orifice disk has the largest diameter.

6. An apparatus for draining condensate from vapor equipment, comprising:
    a valve casing having two ends and defining a flow path for conveying condensate, wherein one end is connected in fluid communication with the vapor equipment and the other end comprises a valve opening;
    a valve plug associated with said valve opening to close and open the valve opening;
    an orifice disk disposed in said valve opening, said orifice disk being formed with a plurality of orifices; and
    a steam stagnating section and a condensate collecting section defined in said flow path upstream of said orifice disk, said steam stagnating section and the condensate collecting section enabling separation of the condensate and the vapor by generally preventing further downstream flow of the vapor while allowing the condensate to be drained through the orifice disk, separation of condensate and vapor utilizing gravity.

7. The apparatus of claim 6, wherein a plurality of valve openings are provided and wherein the valve plug contacts the valve casing at each of said valve openings when said openings are closed.

* * * * *